Feb. 27, 1968  J. B. FREED  3,370,335
METHOD OF MAKING A PLUG VALVE HAVING A FLUOROCARBON SLEEVE
Original Filed June 28, 1960  2 Sheets-Sheet 1
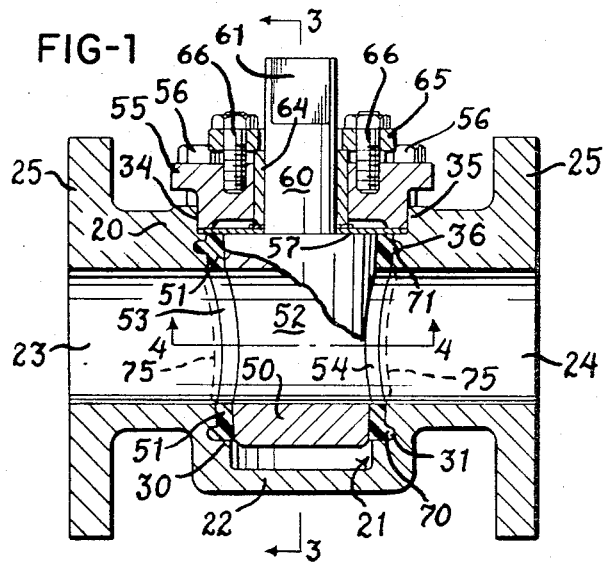
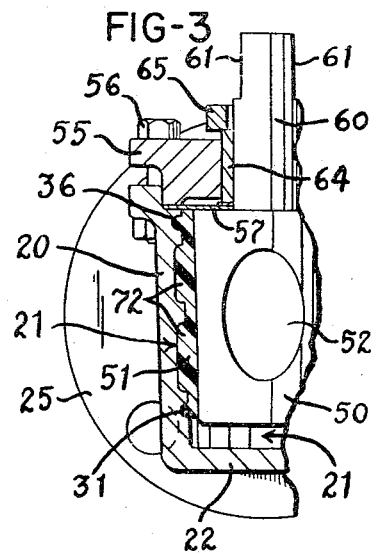
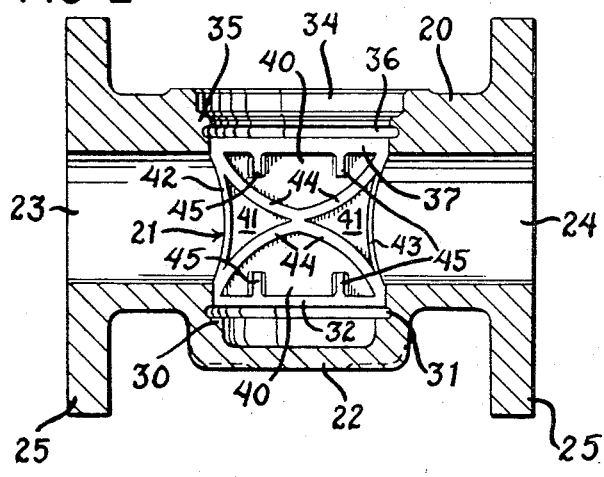
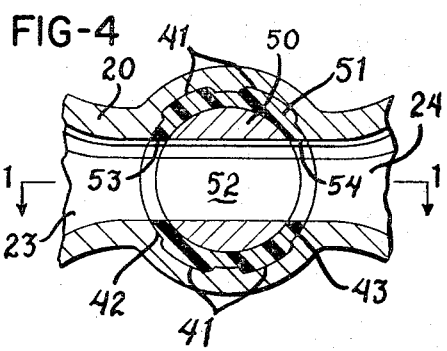
INVENTOR.
JACOB B. FREED
BY
Marechal, Biebel, French & Bugg
ATTORNEYS Feb. 27, 1968     J. B. FREED     3,370,335
METHOD OF MAKING A PLUG VALVE HAVING A FLUOROCARBON SLEEVE
Original Filed June 28, 1960     2 Sheets-Sheet 2
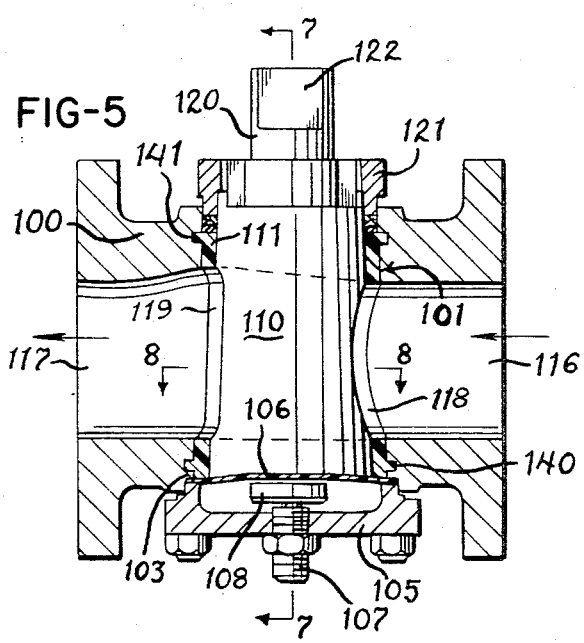
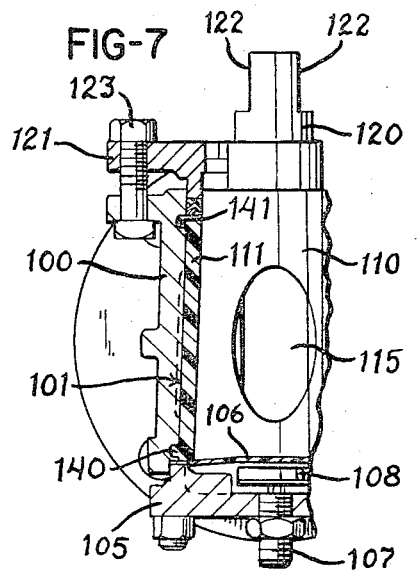
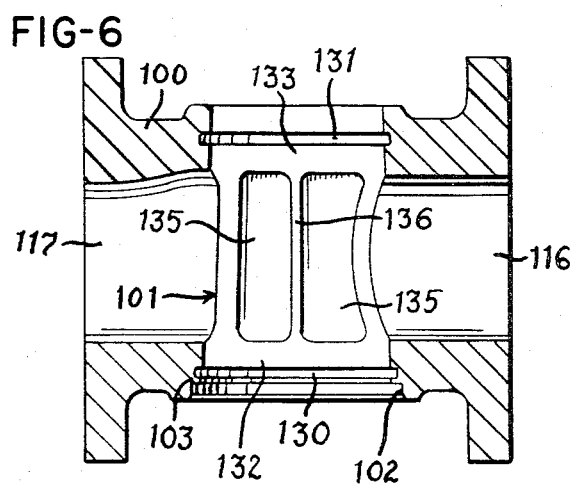
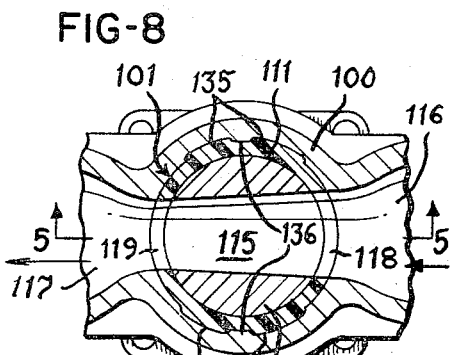
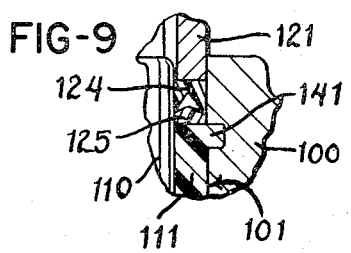
INVENTOR.
JACOB B. FREED
BY
Marechal, Biebel, French & Bugg
ATTORNEYS

United States Patent Office 3,370,335
Patented Feb. 27, 1968

3,370,335
METHOD OF MAKING A PLUG VALVE HAVING A FLUOROCARBON SLEEVE
Jacob B. Freed, Dayton, Ohio, assignor to The Duriron Company, Inc., Dayton, Ohio, a corporation of New York
Application Feb. 21, 1963, Ser. No. 260,952, now Patent No. 3,206,163, which is a continuation of application Ser. No. 38,618, June 28, 1960. Divided and this application Nov. 3, 1964, Ser. No. 414,049
5 Claims. (Cl. 29—157.1)

ABSTRACT OF THE DISCLOSURE

A valve body including pockets and grooves has a fluorocarbon sleeve assembled therein by assembling a blank sleeve into the body, forcing a dummy tapered plug into the sleeve, heating the thus assembled combination to force portions of the sleeve into the pockets and grooves. The combination, with the plug held in place is cooled so that a portion of this sleeve is held in tension. The dummy plug is removed, ports are cut in the sleeve and the remaining components of the valve are assembled.

---

This application is a division of application Ser. No. 260,952, filed Feb. 21, 1963, now U.S. Patent No. 3,206,163, which in turn is a continuation of application Ser. No. 38,618, filed June 28, 1960, now abandoned, and all assigned to the assignee of this application.

This invention relates to sleeve lined plug valves.

The invention is especially related to plug valves employing liner sleeves fabricated of a fluorocarbon material such particularly as one of the polytetrafluoroethylene materials sold under the trade name Teflon. These Teflon materials have definite practical advantages for use in the lining of plug valves from the standpoint of their inert nature, resilience and anti-frictionl properties, as is pointed out in a number of patents and applications assigned to the same assignee as this application, including the patents of Robert C. Schenck, Nos. 2,713,987 and 2,729,420, and Deas Sinkler, No. 2,776,104, and the copending applications of Jacob B. Freed, Ser. No. 778,111, filed Dec. 4, 1958, and Schenck and Freed, Ser. No. 889,353, filed July 24, 1959.

The present invention is particularly concerned with the problem discussed in detail in the above Sinkler patent, namely the maintaining of proper sealing of a Teflon sleeve lined valve over a susbtantial range of temperatures. More specifically, Teflon has a very much higher cofficient of thermal expansion than metal, and if a Teflon sleeve lined valve is assembled and adjusted to sealing condition at room temperature, then if the operating temperature increases, the pressure on the sleeve will increase at a substantial rate. This in itself is not entirely undesirable if thereafter the operating temperature remains fairly consistent, but it may create major difficulties in the event of substantial fluctuations in temperature.

The point just discussed is of substantial importance in installations where, for example, the pipe line and valve normally operate in a compartively low temperature range but from time to time are flushed out with steam for cleaning purposes. If the increase in pressure on the sleeve developed during the steam treatment causes expansion of the sleeve in excess of its elastic limit, permanent deformation of the sleeve material may occur to such a degree that when the valve cools down, the sleeve will not longer provide effective sealing.

It is a particular object of the invention to provide a method of producing a sleeve lined valve of the type outlined above wherein the valve with the sleeve in place is subjected to a controlled conditioning threatment which effectively sets into the sleeve at least the major portion of the stresses it will encounter in use as a result of temperature changes, and thereby establishes conditions in the sleeve which enable it to maintain adequate sealing action over the desired temperature change.

More specifically it is an object of this invention to provide a method as outlined above wherein the assembled valve is heated to a temperature substantially higher than its intended maximum temperature of use with resulting susbtantial elongation of the liner sleeve, and wherein while the assembly cools, the sleeve is held in its alongated condition in such manner that it will always be in tension at temperatures within its intended use range and will not materially expand or contract as the temperature varies within that range.

Additional object and advantages of the invention will be apparent from the following description, the accompanying drawings and the appended claims.

In the drawings—

FIG. 1 is a sectional view through a sleeve lined plug valve constructed in accordance with the invention, the view being taken on the line 1—1 of FIG. 4 and showing the plug in fully open position;

FIG. 2 is a view similar to FIG. 1 with the plug and liner sleeve removed;

FIG. 3 is a fragmentary section taken at right angles to FIG. 1 as indicated by the line 3—3 of FIG. 1;

FIG. 4 is a fragmentary view on the line 4—4 of FIG. 1;

FIG. 5 is a view similar to FIG. 1 showing another form of valve constructed in accordance with the invention, with the view being in section on the line 5—5 of FIG. 8;

FIG. 6 is a view similar to FIG. 5 with the plug and liner sleeve removed;

FIG. 7 is a half-section taken at right angles to FIG. 5 on the line 7—7 of FIG. 5;

FIG. 8 is a fragmentary section on the line 8—8 of FIG. 5; and

FIG. 9 is an enlarged fragment of FIG. 5.

Referring to the drawings, which illustrate preferred embodiments of the invention, the valve in FIGS. 1-4 includes a valve body 20 having a conical bore 21 extending transversely therethrough from the top of the body and having its bottom end closed by an integral portion 22 of the body. It should be noted that the term "bore" is used somewhat loosely since this portion of the body does not require boring or other machining. Ports 23 and 24 open into the bore 21 from opposite sides of the valve body, and flanges 25 are provided at the outer ends of the ports for attachment to pipes in the usual way.

Referring particularly to FIG. 2, an annular shoulder 30 is provided at the lower end of the tapered portion of the bore 21, the inner diameter of this shoulder being appreciatively less than the minimum diameter of the tapered portion of the bore. Above this shoulder 30, the surface of the bore is provided with a continuous groove 31 of substantially greater diameter than the portion of the bore surface immediately thereabove, and it will be seen that this arrangement of the groove 31 provides continuous land portion 32 extending around the lower end of the tapered surface of the bore. By way of illustrative examples, satisfactory results have been obtained with the groove 31 having a depth of .125 inch.

At the top of the valve body 20, there is a counterbore 34 terminating in an annular shoulder 35, and spaced below this shoulder is a second circumferential groove 36 similar to the groove 31. Immediately below this groove 36 is a circumferential land portion 37 of the bore surface similar to the land portion 32 adjacent the lower end of the bore and similarly extending continuously around that surface of the bore.

The surface area of the bore between the land portions 32 and 37 is provided with a plurality of indentations or pockets 40 and 41 which may be of the same depth as the grooves 31 and 36 as compared with the adjacent surface portions of the bore. As best seen in FIG. 2, these pockets 40 and 41 are bordered by the lands 32 and 37, additional land portions 42 and 43 which encircle the ports 23 and 24, and rib portions 44 of the bore surface which resemble a lattice. In addition, the bore surface is provided with short rib portions 45 which project axially from the continuous lands 32 and 37.

The tapered valve plug 50, FIGS. 1 and 3 is of sufficiently smaller radial dimensions than the bore 21 to establish an annular clearance therebetween which is filed by a liner sleeve 51 providing the desired sealing action between the plug and body, and the plug has a through-port 52 adapted for alignment with the body ports 23 and 24 and matching liner ports 53 and 54. The upper end of the valve body 20 is closed by a cap 55 secured to the body by screws 56 and the inner portion of the cap is sealed on the shoulder 35 through an annular thrust diaphragm 57. The plug 50 includes a stem 60 which projects through the cap 55 and is provided with flats 61 on each side thereof for interlocking engagement with an operating handle in the usual way. Sealing pressure of the plug with the sleeve 51 is maintained by means of a gland 64 which engages the upper surface of the plug through the diaphragm 57 and is forced against the plug by the gland follower 65 adjustably secured to the cap 53 by screws 66.

As already noted satisfactory results have been obtained in the manufacture of valves constructed as shown in FIGS. 1–4 by rough casting the body with the bore 21 of the surface characteristics described and without finish grinding except for the shoulder 35. The liner sleeve 51 is fabricated to the approximate dimensions required in the finished valve but with some excess thickness of material which is eliminated during assembly as described hereinafter. As already indicated, preferred results are obtained with the liner sleeve fabricated from polytetrafluoroethylene granular molding powder by preforming, sintering at a temperature of the order of 700° F. and then coining to restore the preformed shape.

The advantages provided by the invention in the finished valve are achieved by assembling and conditioning the valve parts by the following method steps:

(1) The coined sleeve is pressed into the valve body until its lower end seats on the shoulder 30.

(2) The sleeve is then subjected at room temperature to a sizing operation by pressing into the body a plug of the same contour as the plug 50 but preferably having no port therethrough so that it is in effect a blank plug, and and the plug is pressed into the body to a predetermined position which is slightly short of the final position of the plug 50 wherein its port 52 is in alignment with the body ports. During this step, some portion of the material of the liner sleeve will be forced by cold flow to enter the grooves 32 and 37, the pockets 40 and 41, and also the body ports 23 and 24.

(3) The blank plug is replaced by the plug 50 to be used in the finished valve. This step is optional in that the subsequent two steps can be advantageously carried out with the blank plug in the assembly, but for convenience in mass production it may not be economically practical to have as many blank plug as there are valves in production at a given time.

(4) The assembled body, plug and sleeve, with the cap assembly adjusted to hold the plug in the specified predetermined position, are then heated at a predetermined temperature until the entire assembly has reached that temperature. The temperature reached in this step is preferably substantially less than the sintering temperature for the sleeve material but substantially higher than the maximum temperature to which the finished valve is expected to be subjected during use. During this step, and owing to the substantially higher coefficient of thermal expansion of the Teflon material, the sleeve will be forced to flow in all possible directions in order to relieve the excess pressure thereon created by its confinement between the plug and body, and it will therefore flow into all of the grooves and indentations in the bore as well as the body ports and to a limited extent beyond the shoulders 30 and 35. This condition is illustrated in FIG. 1 by the rib portions 70 and 71 in the grooves 31 and 36, the portions 62 in FIG. 3, and the portions 75 shown in dotted lines in FIG. 1.

(5) The assembly is then removed from the oven and permitted to cool to room temperature without adjustment of the plug. During this step, the sleeve will tend to contract to its original dimensions, but it will to a major extent be held against such contraction by reason of the rib portions 70 and 71 thereof which are interlocked with the grooves 31 and 36, and also by the portions 72 which have expanded into the body ports and the pockets 40 and 41.

(6) The plug is removed from the body, and while this step is easier if a blank plug was used during step 4, it is relatively easy even if the regular plug had been used owing to the fact that the major flow of the sleeve material 75 is outwardly into the body ports 23 and 24 rather than into the plug port. This sleeve material is then cut out from within the body ports, and also any excess material which may have flowed beyond the shoulder 35 is trimmed away.

(7) The regular plug 50 is inserted in the body, the top cap assembly is applied, and the plug is forced to its final position within the body.

Extensive tests carried out with valves produced as just described in connection with FIGS. 1–4 establish that such valves are practically unaffected by temperature changes over a wide range so long as the maximum temperature is appreciatively below the temperature to which the assembly was heated during step 4. For example, if the temperature of treatment was 425° F., the valve will show no tendency to leak over a range from room temperature or below up to a temperature of the order of 350° F. It appears that this result is due to the fact that the conditioning treatment effectively locks the ends of the sleeve in the body in such manner that it is prevented from dimensional changes during subsequent changes in temperature. In other words, instead of a condition wherein the sleeve can subsequently expand and contract in response to temperature variations, the sleeve is held in tension at all tempertaures below its temperature of treatment in such manner that the normal variations in dimensions are replaced by variations in the stresses within the sleeve. Thus when the valve is in the lower portion of its operating range, the tensional stresses are at a maximum, and as the valve is heated, these tension stresses are but partially relieved hence the sleeve does not expand.

A major advantage of the method and product of the the invention lies in the establishment of continuous bands of high pressure sealing action which encircle each of the body ports and also each end of the bore. More specifically, it will be apparent that the thickness of the sleeve is at a minimum in the portions which overlie the respective lands 32, 37, 42 and 43, and the tensioned stresses therein are therefore at a maximum at lower temperatures. Furthermore, since these lands are completely interrupted at each end of the bore by the grooves 31 and 36, the sleeve material is held against axial movement through these areas as the temperature changes so that full sealing is assured at all points in the desired operating range and temperatures.

The pattern of indentations 40 and 41 and the ribs 44 and 45 is of importance in several respects in achieving the results of the invention. In the first place, they supplement the action of the grooves 31 and 36 in holding the liner sleeve against expansion and contraction, and they also lock the sleeve against angular movement in the bore as the plug turns. In addition, it will be apparent from FIG. 2 that the ribs form a comparatively minor proportion of the surface area of the bore which lies between the ports, and the indentations 40 and 41 correspondingly provide ample space for the relief of stresses in the sleeve as the temperature changes. Thus at room temperature, the sleeve material which overlies and projects into these indentations will be under substantially less stress than the material overlying the lands 32, 37, 42 and 43, and it absorbs some of the stresses effective on those portions of the sleeve as the temperature increases. Another important result of this condition is the relief of the torque required to turn the plug, since the sealing pressure across the several indentations is substantially less than across the other portions of the bore.

FIGS. 5-8 show another construction of valve in accordance with the invention wherein the body 100 has a bore 101 extending completely therethrough and tapering toward the upper end of the body. The lower end of the bore 101 has a counterbore 102 providing a shoulder 103 against which the bottom cap 105 seals through a diaphragm 106. The cap 105 carries a pressure screw 107 which operates through a thrust member 108 and the diaphragm 106 to maintain upward pressure on the larger end of the tapered valve plug 110 and liner sleeve 111.

The plug 110 includes a through-port 115 for alignment with the body ports 116 and 117 and liner ports 118 and 119 and it will be noted that these body ports are differently contoured with the inlet port 116 shorter and wider than the outlet port 117 in order to assure throttling of the flow at the downstream end of the complementarily contoured plug port as described in the above noted Schenck and Freed application. The plug 110 also includes the usual stem 120 which projects through the top cap 121 and has flats 122 for engagement with an operating handle. The top cap 121 is secured to the body by bolts 123 and includes a gland portion which provides sealing engagement with the upper end of the sleeve 111 through a pair of complementary chevron type sealing rings 124 and 125 which may advantageously be made of Teflon material.

Referring particularly to FIG. 6, the bore 101 is provided with a circumferential groove 130 spaced between the shoulder 103 and the ports 116 and 117, and there is a similar circumferential groove 131 spaced between the body ports and the upper end of the bore. This arrangement of the grooves 130 and 131 is similar to that of grooves 31 and 36 in providing continuous land portions 132 and 133 encircling the bore adjacent the ports, and a plurality of indentations or pockets 135 comparable with the pockets 40 and 41 in the valve 20 are formed between the land portions 132 and 133. There is a pair of these pockets 135 on each side of the bore between the ports, and they are separated by a rib 136 connecting the land portions 132 and 133.

The valve parts for the valve of FIGS. 5-8 may be assembled in accordance with the invention by following essentially the same method steps already outlined for the valve of FIGS. 1-4. These steps may be partially summarized as follows:

(1) The coined sleeve 111 is pressed into the valve body without having the top cap 121 in place.

(2) The sleeve is sized at room temperature by a blank plug.

(3) Optionally, the blank plug is replaced by the plug 110 for the finished valve. In either case, the bottom cap 105 is applied, and the plug is pressed to a predetermined position short of the final plug position in the body.

(4) The assembly is heated as described for the valve of FIGS. 1-4.

(5) The assembly is cooled to room temperature without adjustment of the plug.

(6) The plug is removed from the body, and the ports are cleared of the sleeve material. Also, excess sleeve material is trimmed from above the groove 131.

(7) The top cap 121 and sealing rings 124 and 125 are assembled in place.

(8) The regular plug 110 is inserted, the bottom cap assembly is applied, and the plug is forced to its final position within the body.

The result of the above steps is essentially the same as already described for the valve of FIGS. 1-4. In particular, the sleeve material will be forced into the grooves 130 and 131 to form the desired end locking ribs 140 and 141, and also sleeve material will be forced into the pockets 135. The result will be that the valve will retain sealing efficiency over a wide temperature range provided the maximum temperature in such range is substantially less than the temperature to which the valve was heated during step 4.

The arrangement of contoured ports and the pocket arrangement in the valve of FIGS. 5-8 has been found especially desirable with valves of comparatively large size, for example wherein the diameter of the outer ends of the body ports is 3 inches and more. This is true both for valves of the type shown on FIGS. 5-8 and also of the type shown on FIGS. 1-4 having a closed bottom on the body. The conventional port arrangement and pattern of ribs and indentations in the valve body of FIGS. 1-4 has been found particularly useful in the correspondingly sized range of 1 to 2 inches. It will be apparent, however, that both types of valve as shown and described share the same distinguishing characteristics provided by the continuous grooves at each end of the bore and the resulting locking of the liner in tension for effective sealing action over a wide temperature range.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. The method of manufacturing a sleeve lined plug valve which includes the steps of producing a metal valve body having a bore extending transversely thereof and ports therethrough opening into said bore in angularly spaced relation and having also a pair of continuous circumferential grooves located respectively adjacent opposite ends of said bore in axially spaced relation with said ports, producing a tapered metal valve plug receivable in said bore and of sufficiently smaller radial dimensions than said bore to establish an annular clearance therebetween, fabricating a liner sleeve receivable in said clearance of sintered fluorocarbon material having a coefficient of thermal expansion substantially greater than that of said plug and body, inserting said sleeve in said bore, forcing said plug into said sleeve to a predetermined position with respect to said body, heating the resulting assembly to an elevated temperature while maintaining said plug in said predetermined position to cause integral portions of the material of said sleeve to extrude into said grooves and also into said ports, cooling said assembly while maintaining said plug in said predetermined position to cause said extruded portions of said sleeve to be at least partially retained in said grooves and said ports and thereby to cause the remainder of said sleeve to be held in tension, and thereafter removing said plug and cutting out the material of said sleeve from within said ports.

2. The method of manufacturing a sleeve lined plug valve which includes the steps of producing a metal valve body having a bore extending transversely thereof and ports therethrough opening into said bore in angularly spaced relation, said step including providing the surface of said bore with at least one indentation located in spaced relation with said ports in each of the spaces between said ports and a pair of continuous circumferential grooves located respectively adjacent opposite ends of said bore in axially spaced relation with said ports and said indentations, producing a tapered metal valve plug receivable in said bore and of sufficiently smaller radial dimensions than said bore to establish an annular clearance therebetween, fabricating a liner sleeve receivable in said clearance of sintered fluorocarbon material having a coefficient of thermal expansion substantially greater than that of said plug and body, inserting said sleeve in said bore, forcing said plug into said sleeve to a predetermined position with respect to said body, heating the resulting assembly to an elevated temperature while maintaining said plug in said predetermined position to cause integral portions of the material of said sleeve to extrude into said grooves indentations and also into said ports, cooling said assembly while maintaining said plug in said predetermined position to cause said extruded portions of said sleeve to be at least partially retained in said indentations and grooves and in said ports and thereby to cause the remainder of said sleeve to be held in tension, and thereafter removing said plug and cutting out the material of said sleeve from within said ports.

3. The method of manufacturing a sleeve lined plug valve which includes the steps of producing a metal valve body having a bore extending transversely thereof and ports therethrough opening into said bore in angularly spaced relation and having also a pair of continuous cricumferential grooves located respectively adjacent opposite ends of said bore in axially spaced relation with said ports, producing a pair of tapered metal valve plugs receivable in said bore and of sufficiently smaller radial dimensions than said bore to establish an angular clearance therebetween, one of said plugs being blank and the other having a port therethrough for alignment with said body ports, fabricating a liner sleeve receivable in said clearance of sintered fluorocarbon material having a coefficient of thermal expansion substantially greater than that of said plug and body, inserting said sleeve in said bore, forcing said blank plug into said sleeve to a predetermined position with respect to said body short of the final position of said ported plug in said body, heating said body and sleeve to an elevated temperature while maintaining one of said plugs in said predetermined position to cause integral portions of the material of said sleeve to extrude into said grooves and also into said body ports, cooling said assembled parts while maintaining said plug in said predetermined position to cause said extruded sleeve portions to be at least partially retained in said grooves and said ports and thereby to cause the material of said sleeve to be held in tension, removing said plug, cutting out said retained sleeve material from within said body ports, and inserting said ported plug to said final portion thereof within said body.

4. The method of manufacturing a sleeve lined plug valve which includes the steps of producing a metal valve body having a bore extending transversely thereof and ports therethrough opening into said bore in angularly spaced relation and having also a pair of continuous circumferential grooves located respectively adjacent opposite ends of said bore in axially spaced relation with said ports, producing a pair of tapered metal valve plugs receivable in said bore and of sufficiently smaller radial dimensions than said bore to establish an angular clearance therebetween, one of said plugs being blank and the other having a port therethrough for alignment with said body ports, fabricating a liner sleeve receivable in said clearance of sintered fluorocarbon material having a coefficient of thermal expansion substantially greater than that of said plug and body, inserting said sleeve in said bore, forcing said blank plug into said sleeve to a predetermined position with respect to said body short of the final position of said ported plug in said body, heating said body and sleeve to an elevated temperature while maintaining said blank plug in said predetermined position to cause integral portions of the material of said sleeve to extrude into said grooves and also into said body ports, cooling said assembled parts while maintaining said plug in said predetermined position to cause said extruded sleeve portions to be at least partially retained in said grooves and said ports and thereby to cause the material of said sleeve to be held in tension, removing said plug, cutting out said retained sleeve material from within said body ports, and inserting said ported plug to said final portion thereof within said body.

5. The method of manufacturing a sleeve lined plug valve which includes the steps of producing a metal valve body having a bore extending transversely thereof and ports therethrough opening into said bore in angularly spaced relation and having also a pair of continuous circumferential grooves located respectively adjacent opposite ends of said bore in axially spaced relation with said ports, producing a pair of tapered metal valve plugs receivable in said bore and of sufficiently smaller radial dimensions than said bore to establish an angular clearance therebetween, one of said plugs being blank and the other having a port therethrough for alignment with said body ports, fabricating a liner sleeve receivable in said clearance of sintered fluorocarbon material having a coefficient of thermal expansion substantially greater than that of said plug and body, inserting said sleeve in said bore, forcing said blank plug into said sleeve to a predetermined position with respect to said body short of the final position of said ported plug in said body, replacing said blank plug with said ported plug, heating the resulting assembly to an elevated temperature while maintaining said ported plug in said predetermined position to cause integral portions of the material of said sleeve to extrude into said grooves and also into said body ports, cooling said assembled parts while maintaining said plugs in said predetermined position to cause said extruded sleeve portions to be at least partially retained in said grooves and said ports and thereby to cause the material of said sleeve to be held in tension, removing said plug, cutting out said retained sleeve material from within said body ports, and inserting said ported plug to said final portion thereof within said body.

References Cited
UNITED STATES PATENTS

| | | | |
|---|---|---|---|
| 2,340,566 | 2/1944 | Ryder | 29—156.4 |
| 2,844,352 | 7/1958 | Dahl | 29—157.1 |
| 3,041,036 | 6/1962 | McFarland. | |
| 3,134,572 | 5/1964 | Glasgow | 29—157.1 |
| 3,199,835 | 8/1965 | Freed | 251—309 |

JOHN F. CAMPBELL, *Primary Examiner.*

P. M. COHEN, *Assistant Examiner.*